United States Patent
Hsieh

(10) Patent No.: US 10,000,599 B2
(45) Date of Patent: Jun. 19, 2018

(54) PHOSPHORUS-CONTAINING VINYL POLYPHENYLENE ETHER, RESIN COMPOSITION COMPRISING PHOSPHORUS-CONTAINING VINYL POLYPHENYLENE ETHER AND PRODUCT THEREOF

(71) Applicant: Elite Material Co., Ltd., Taoyuan (TW)

(72) Inventor: Chen Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 0 days. days.

(21) Appl. No.: 15/373,834

(22) Filed: Dec. 9, 2016

(65) Prior Publication Data

US 2018/0086870 A1    Mar. 29, 2018

(30) Foreign Application Priority Data

Sep. 23, 2016 (TW) ............................. 105130931 A

(51) Int. Cl.
*C08K 7/18*      (2006.01)
*C08F 230/02*   (2006.01)

(52) U.S. Cl.
CPC ............. *C08F 230/02* (2013.01); *C08K 7/18* (2013.01); *C08F 2810/20* (2013.01)

(58) Field of Classification Search
CPC ..................................................... C08F 230/02
USPC ......................................................... 525/392
See application file for complete search history.

(56) References Cited

U.S. PATENT DOCUMENTS

2017/0166729 A1*  6/2017  Hu ........................... C08K 5/14

* cited by examiner

*Primary Examiner* — Terressa Boykin
(74) *Attorney, Agent, or Firm* — Muncy, Geissler, Olds & Lowe, P.C.

(57) ABSTRACT

The disclosure relates to a phosphorus-containing vinyl polyphenylene ether obtained by reacting a phosphorus-containing vinyl compound with a vinyl polyphenylene ether, a resin composition including the phosphorus-containing vinyl polyphenylene ether and a product thereof. Various products can be made from the resin composition, such as resin films, prepregs, resin-coated coppers, laminates or printed circuit boards, and they have one, multiple or all of the following properties: lower coefficient of thermal expansion, lower thermal expansion, higher thermal resistance, better flame retardancy, lower dielectric constant, lower dielectric loss and so forth.

16 Claims, No Drawings

PHOSPHORUS-CONTAINING VINYL POLYPHENYLENE ETHER, RESIN COMPOSITION COMPRISING PHOSPHORUS-CONTAINING VINYL POLYPHENYLENE ETHER AND PRODUCT THEREOF

CROSS-REFERENCE TO RELATED APPLICATION

This application claims the priority benefits of Taiwan Patent Application No. 105130931, filed on Sep. 23, 2016, the entirety of which is incorporated by reference herein and made a part of this specification.

BACKGROUND OF THE INVENTION

1. Field of the Invention

The present disclosure generally relates to a polyphenylene ether resin, and more specifically, to a polyphenylene ether compound or a prepolymer with improved properties, as well as a resin composition comprising the polyphenylene ether compound or the prepolymer and a product thereof.

2. Description of Related Art

With the rapid development of electronic technologies, information processing of electronic products, such as mobile communications, servers and cloud storage, has been developed toward high frequency signal transmission and high speed digitalization, such that resin materials having lower dielectric properties have become the mainstream for current high frequency and high transmission speed laminates so as to meet the demands of high-speed information transmission. The major requirements of resin products, such as copper-clad laminates, include lower dielectric constant (Dk), lower dielectric loss (a.k.a. dissipation factor, Df), higher reliability, higher thermal and moisture resistance, higher dimensional stability and so forth. Therefore, the industry aims to develop materials applicable to high performance printed circuit boards (PCB).

As compared with other resin materials, polyphenylene ether resins (PPE resins, also known as polyphenylene oxide resins, PPO resins) have lower dielectric constant and dielectric loss, thereby gradually becoming the ideal materials suitable for printed circuit boards of low dielectric properties at high frequency.

However, some properties of the currently available polyphenylene ether, such as dihydroxyl polyphenylene ether or bis(vinylbenzyl) polyphenylene ether, fail to meet the demands in the printed circuit board industry. For example, the performance of the conventional polyphenylene ether in flame retardancy, thermal resistance and so forth are not ideal. In order to solve the problems, flame retardants are incorporated into conventional polyphenylene ether resin compositions. Common flame retardants include phosphorus-containing compounds, such as condensed phosphate (e.g. PX-200, PX-202 and so forth), DOPO compounds (e.g. XZ92741 and so forth) or hypophosphite (e.g. OP-930, OP-935 and so forth), so as to improve the flame retardancy of conventional polyphenylene ether. However, these flame retardants not only deteriorate the dielectric properties but lower the thermal resistance of the products of the polyphenylene ether resin compositions. Thus, it is difficult to meet the requirements of dielectric properties, flame retardancy and thermal resistance at the same time.

Therefore, suppliers of resin compositions and manufacturers of laminates have the desire to develop novel polyphenylene ether compounds having better performances in dielectric properties, flame retardancy, thermal resistance and other properties.

SUMMARY OF THE INVENTION

In order to solve the above-mentioned problems and other problems, a phosphorus-containing vinyl polyphenylene ether obtained by reacting a phosphorus-containing vinyl compound with a vinyl polyphenylene ether is provided by the present disclosure. For example, the phosphorus-containing vinyl compound and the vinyl polyphenylene ether may be subject to pre-polymerization so that a phosphorus-containing vinyl polyphenylene ether prepolymer is obtained.

In one embodiment, the aforementioned phosphorus-containing vinyl compound comprises an allyl phosphazene compound, a vinylbenzyl ether phosphazene compound, a vinyl phosphonate compound, an acrylate DOPO compound or a combination thereof.

In one embodiment, the aforementioned phosphorus-containing vinyl compound comprises an allyl phosphazene compound having the following structural unit:

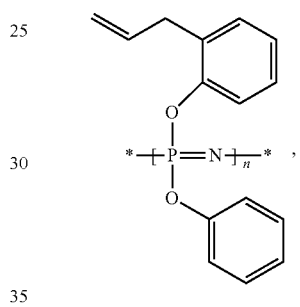

wherein n is an interger of 1 to 6, for example, n=3.

In one embodiment, the aforementioned phosphorus-containing vinyl compound comprises a vinylbenzyl ether phosphazene compound having the following structural unit:

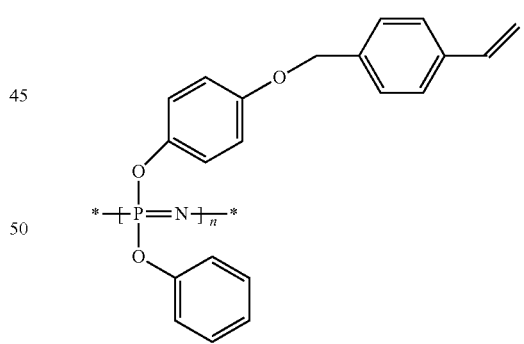

wherein n is an interger of 1 to 6.

In one embodiment, the aforementioned vinyl polyphenylene ether is a polyphenylene ether containing an unsaturated double bond at at least one terminal; for example, the aforementioned vinyl polyphenylene ether comprises methacrylate polyphenylene ether, vinylbenzyl polyphenylene ether, chain-extended polyphenylene ether or a combination thereof.

In another aspect, a resin composition comprising the aforementioned phosphorus-containing vinyl polyphenylene ether and at least one crosslinking agent is provided by the present disclosure.

In one embodiment, the aforementioned crosslinking agent comprises divinylbenzene, bis(vinylphenyl) ether, isocyanate, polyphenylene ether resin, maleimide, polyamide, polyimide, styrene maleic anhydride copolymer, polyester, polyolefin, anhydride curing agent or a combination thereof.

In one embodiment, the aforementioned resin composition further comprises any one of a phosphorus-containing flame retardant, a curing accelerator, an inorganic filler, a surfactant, a toughening agent, a solvent and a combination thereof.

In one embodiment, in addition to the phosphorus-containing vinyl polyphenylene ether, the aforementioned resin composition further comprises another polyphenylene ether (referred to as a second polyphenylene ether).

For example, based on 100 parts by weight of the total amount of the resin composition, the content of the phosphorus-containing vinyl polyphenylene ether ranges from 50 to 100 parts by weight, for example, 60 to 100 parts by weight or 70 to 100 parts by weight.

For example, based on 100 parts by weight of the total amount of the resin composition, the content of the second polyphenylene ether ranges from 0 to 50 parts by weight, for example, 0 to 40 parts by weight or 0 to 30 parts by weight.

In yet another aspect, a product made from the aforementioned resin composition is provided by the present disclosure, comprising a resin film, a prepreg, a resin-coated copper, a laminate or a printed circuit board.

In one embodiment, the product has a Z-axis coefficient of thermal expansion $\alpha 1$ as measured by a TMA instrument by reference to IPC-TM-650 2.4.24.5 of lower than or equal to 50 ppm/°C., for example, between 43 ppm/°C. and 50 ppm/°C.

In one embodiment, the product has a Z-axis thermal expansion as measured by a TMA instrument by reference to IPC-TM-650 2.4.24.5 of lower than or equal to 3.00%, for example, lower than or equal to 2.96%. For instance, the aforementioned Z-axis thermal expansion is between 2.48% and 2.96%.

In one embodiment, the product has a thermal resistance T288 as measured by a TMA instrument by reference to IPC-TM-650 2.4.24.1 of greater than 70 minutes.

In one embodiment, the product has a flame retardancy of UL94 V0 or V1.

In one embodiment, the aforementioned resin composition has an excellent resin flow property, for example, between 10% and 35%. For instance, the aforementioned resin flow is between 10% and 30%.

In one embodiment, the product has a smooth surface by visual inspection and the problem of dry laminate does not occur.

In one embodiment, the product has a glass transition temperature (Tg) as measured by a TMA instrument by reference to IPC-TM-650 2.4.24.5 of greater than or equal to 150° C., for example, greater than or equal to 160° C., greater than or equal to 165° C., greater than or equal to 170° C., or greater than or equal to 175° C. For instance, the aforementioned glass transition temperature is between 150° C. and 180° C.

In one embodiment, the product has a solder dipping (S/D) property as measured by reference to IPC-TM-650 2.4.23 of greater than 20 cycles, i.e. no delamination observed after 20 solder dipping cycles.

In one embodiment, the product has a dielectric constant as measured at 10 GHz by reference to JIS C2565 of lower than or equal to 4.00, for example, lower than or equal to 3.90, lower than or equal to 3.80, such as between 3.65 and 3.94.

In one embodiment, the product has a dielectric loss as measured at 10 GHz by reference to JIS C2565 of lower than or equal to 0.0070, for example, lower than or equal to 0.0060, such as between 0.0055 and 0.0070.

Accordingly, the present disclosure provides a phosphorus-containing vinyl polyphenylene ether, a resin composition including the phosphorus-containing vinyl polyphenylene ether and a product thereof, which can achieve one, multiple or all of the aforementioned ideal properties.

DESCRIPTION OF THE EMBODIMENTS

For a person having ordinary skill in the art to appreciate the characteristics and effects of the present disclosure, the following general description and definitions of the terms as used in the specification and the claims are given hereby. Unless otherwise specified, all technical and scientific terms used herein have ordinary meanings as understood by the person having ordinary skill in the art. When there is a conflict, the definition in the present specification shall control.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions defined as a numeric range or percentage range format are merely for convenience and brevity and therefore should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so no, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, "40.0" should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$ is fully presented.

The present disclosure is further described in conjunction with the embodiments and examples below. It is understood that these embodiments and examples are merely exemplary without limiting the scope of the present disclosure or applications thereof. In addition, the present disclosure is not limited to any theory described in the foregoing background or summary or the following detailed description of embodiments or examples.

Phosphorus-Containing Vinyl Polyphenylene Ether

As described above, a main purpose of the present disclosure is to provide a phosphorus-containing vinyl polyphenylene ether.

Unless otherwise specified, the phosphorus-containing vinyl polyphenylene ether can also be named as "phosphorus-containing vinyl polyphenylene ether compound," "phosphorus-containing vinyl polyphenylene ether prepolymer" or "phosphorus-containing vinyl polyphenylene ether resin," and those expressions can be used interchangeably, which are all used for indicating a product obtained by the reaction between a phosphorus-containing vinyl compound (also known as "a vinyl phosphorus-containing compound") and a vinyl polyphenylene ether (such as a vinyl-terminated polyphenylene ether), such as via pre-polymerization.

The process for preparing the phosphorus-containing vinyl polyphenylene ether is generally as follows: a phosphorus-containing vinyl compound, a vinyl polyphenylene ether, and an optional peroxide are subject to a reaction at a temperature higher than room temperature so as to obtain the phosphorus-containing vinyl polyphenylene ether.

For example, a phosphorus-containing vinyl compound, a vinyl polyphenylene ether and a solvent are added into a stirred tank, optionally a peroxide is added, mixed well and heat to 80° C. to 110° C., followed by continuous stirring for 3 to 6 hours. After that, water is added and stirred and then waste liquid is removed. Distillation under reduced pressure is employed to remove solvent, thereby obtaining a prepolymer of the phosphorus-containing vinyl compound and the vinyl polyphenylene ether, i.e. the phosphorus-containing vinyl polyphenylene ether of the present disclosure.

Regarding the phosphorus-containing vinyl compound, it can be any phosphorus-containing compounds containing a vinyl group. For example, the aforementioned phosphorus-containing vinyl compound may comprise an allyl phosphazene compound, a vinylbenzyl ether phosphazene compound, a vinyl phosphonate compound, an acrylate DOPO compound or a combination thereof.

In one embodiment, the aforementioned phosphorus-containing vinyl compound comprises an allyl phosphazene compound having the following structural unit:

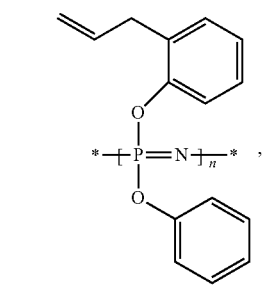

wherein n is an interger of 1 to 6, for example, n=3. For instance, the allyl phosphazene compound is SPV-100, a product purchased from Otsuka Chemical Co., Ltd. For instance, the allyl phosphazene compound has the following structure:

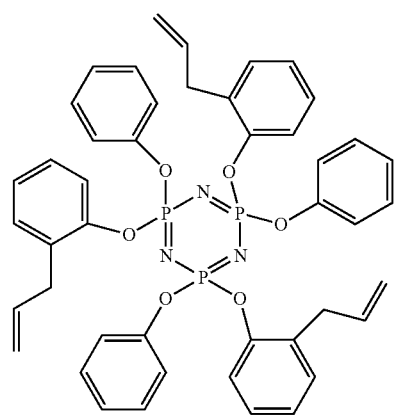

In one embodiment, the aforementioned phosphorus-containing vinyl compound comprises a vinylbenzyl ether phosphazene compound having the following structural unit:

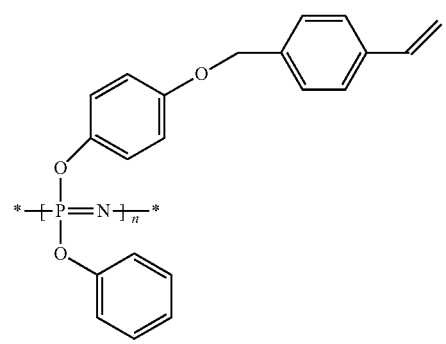

wherein n is an interger of 1 to 6. For instance, the vinylbenzyl ether phosphazene compound may comprise each of the vinylbenzyl ether phosphazene compounds disclosed in U.S. Pat. No. 9,000,077 B2, which is incorporated by reference herein in its entirety and made a part of this specification. For instance, the vinylbenzyl ether phosphazene compound has the following structure:

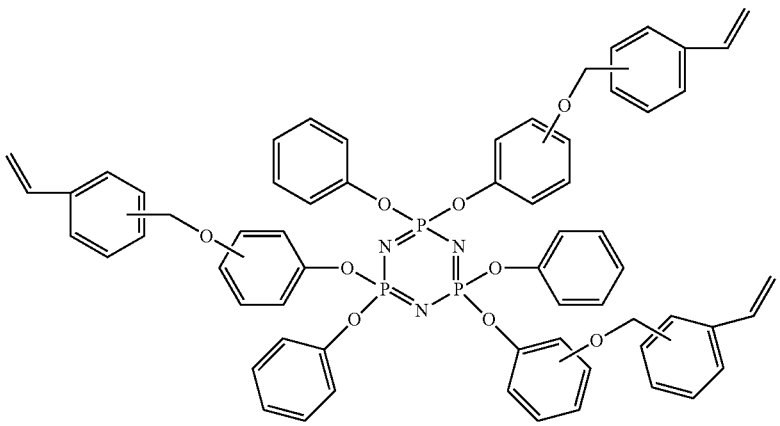

In one embodiment, the aforementioned phosphorus-containing vinyl compound comprises a vinyl phosphonate compound having the following chemical structure:

or a combination thereof.

In one embodiment, the aforementioned phosphorus-containing vinyl compound comprises an acrylate DOPO compound having the following chemical structure:

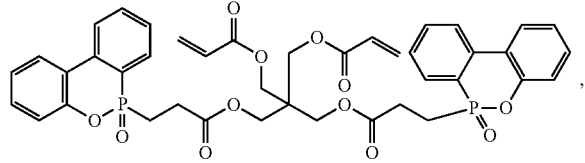 [SMILES: C=CC(=O)OCC(COC(=O)C=C)(COC(=O)CCP1(=O)Oc2ccccc2-c2ccccc21)COC(=O)CCP1(=O)Oc2ccccc2-c2ccccc21]

for example an acrylate DOPO flame retardants MF784 purchased from UFC Corporation.

Regarding the vinyl polyphenylene ether, it can be any polyphenylene ether compounds or resins including an unsaturated double bond at at least one terminal. For instance, the aforementioned vinyl polyphenylene ether may comprise methacrylate polyphenylene ether (e.g. a methacrylate-terminated polyphenylene ether resin SA-9000 sold by Sabic), vinylbenzyl polyphenylene ether (e.g. a vinylbenzyl-terminated polyphenylene ether resin OPE-2st sold by Mitsubishi Gas Chemical Company), a chain-extended polyphenylene ether or a combination thereof.

The aforementioned chain-extended polyphenylene ether is, for example, the polyphenylene ether resin having the following structure of Formula (1):

Formula (1)

wherein b is a positive integer (e.g. an integer of 1 to 20, preferably an integer of 1 to 5), and X is any one or the combination of the structures selected from Formula (2) to Formula (4):

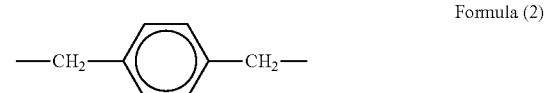

Formula (2)

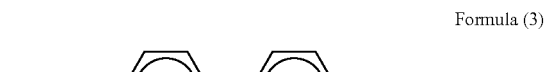

Formula (3)

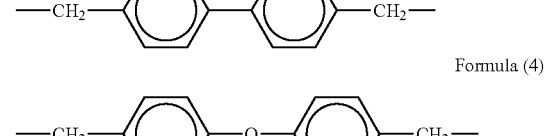

Formula (4)

Y has a structure as shown in the following Formula (5):

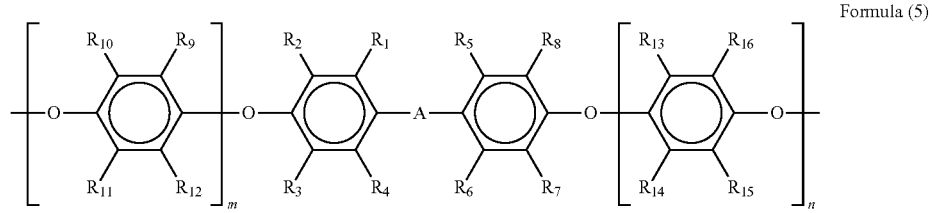

Formula (5)

wherein each of m and n is independently an integer of 1 to 30; each of $R_1$ to $R_{16}$ is independently selected from hydrogen, —$CH_3$ or halogen atoms; A is selected from a covalent bond, —$CH_2$—, —$CH(CH_3)$—, —$C(CH_3)_2$, —O—, —S—, —$SO_2$— or carbonyl group;

Z has any one or the combination of the structure of Formula (6), Formula (7) or Formula (8):

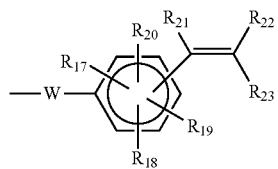
Formula (6)

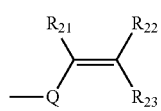
Formula (7)

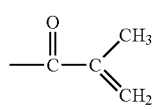
Formula (8)

wherein each of $R_{17}$ to $R_{23}$ is independently selected from hydrogen, —$CH_3$ or halogen atoms; each of Q and W is independently an aliphatic group, such as a $C_1$ to $C_3$ aliphatic group, and W is preferably —$CH_2$—. In one embodiment, in Formula (7), all of $R_{21}$ to $R_{23}$ are hydrogen, Q is —$CH_2$—, and such that Z is an allyl group.

For instance, the aforementioned chain-extended polyphenylene ether may comprise each of the polyphenylene ether resins disclosed in US Patent Application Publication No. 2016/0185904 A1, which is incorporated by reference herein in its entirety and made a part of this specification.

Regarding the peroxide capable of promoting the pre-polymerization, it is not particularly limited and may comprise any one or more peroxides capable of promoting the pre-polymerization between the phosphorus-containing vinyl compound and the vinyl polyphenylene ether, such as benzoyl peroxide (BPO).

Resin Composition

In another aspect, a resin composition comprising the aforementioned phosphorus-containing vinyl polyphenylene ether and at least one crosslinking agent is provided by the present disclosure.

Unless otherwise specified, the amounts of the phosphorus-containing vinyl polyphenylene ether and the crosslinking agent as well as the ratio between each component can be adjusted according to the needs. For instance, in one embodiment, the present disclosure discloses a resin composition comprising 50 to 100 parts by weight of the phosphorus-containing vinyl polyphenylene ether and 0 to 40 parts by weight of the at least one crosslinking agent, and preferably comprising 60 to 100 parts by weight of the phosphorus-containing vinyl polyphenylene ether and 3 to 35 parts by weight of the at least one crosslinking agent.

In one embodiment, the aforementioned crosslinking agent is any one or the combination of the following: a small molecule vinyl monomer (such as divinylbenzene), divinyl diphenyl ethane, triallyl isocyanurate, triallyl cyanurate, diallyl bisphenol A, tricyclodecane dimethyl acrylate, tris (2-hydroxyethyl)isocyanate, trimethyl acrylate, isocyanate, polyphenylene ether resin, maleimide, polyamide, polyimide, styrene maleic anhydride copolymer, polyester, acrylate, polyolefin (such as styrene-butadiene copolymer, styrene-butadiene-divinylbenzene terpolymer, polybutene, and so forth), and anhydride curing agent.

In addition, the aforementioned resin composition may further optionally comprise a property modifier, such as any one of a phosphorus-containing flame retardant, a curing accelerator, an inorganic filler, a surfactant, a toughening agent, a solvent and a combination thereof.

The aforementioned property modifier is mainly used for adjusting the properties of the resin composition or the product thereof of the present disclosure, which comprise but not limited to flame retardancy, thermal resistance, dielectric constant, dielectric loss, toughness, reactivity, viscosity, glass transition temperature, dimensional stability (coefficient of thermal expansion or thermal expansion) and solubility.

For instance, the phosphorus-containing flame retardant is at least one of the following compounds, but not limited thereto: bisphenol diphenyl phosphate, ammonium polyphosphate, hydroquinone bis-(diphenyl phosphate), bisphenol A bis-(diphenylphosphate), tri(2-carboxyethyl)phosphine (TCEP), tris(chloroisopropyl) phosphate, trimethyl phosphate (TMP), dimethyl methyl phosphonate (DMMP), resorcinol bis(dixylenyl phosphate) (RDXP, such as PX-200, purchased from Daihachi Chemical Industry Co., Ltd.), phosphazene compound (phosphazene, such as SPB-100, purchased from Otsuka Chemical Co., Ltd.), m-phenylene methylphosphonate (PMP), melamine polyphosphate, 9,10-dihydro-9-oxa-10-phosphaphenanthrene-10-oxide (DOPO), DOPO-containing phenolic resin (such as DOPO-HQ-containing resin, DOPO-containing phenol novolac resin (DOPO-PN resin), DOPO-containing bisphenol novolac resin (DOPO-BPN resin), diphenyl phosphine oxide (DPPO) compound, diphenylphosphine oxide derivatives and so forth. The DOPO-BPN resin may be bisphenol novolac compounds such as DOPO-bisphenol A novolac (DOPO-BPAN), DOPO-bisphenol F novolac (DOPO-BPFN), DOPO-bisphenol S novolac (DOPO-BPSN) and so forth.

In one embodiment, the aforementioned phosphorus-containing flame retardant comprises an acrylate DOPO compound having the following chemical structure:

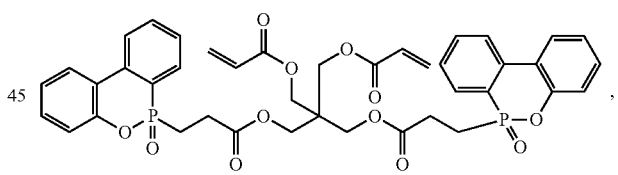

for example an acrylate DOPO flame retardants MF784 purchased from UFC Corporation.

For instance, the curing accelerator may comprise a catalyst, such as a Lewis base or a Lewis acid. The Lewis base may comprise one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise a metal salt compound, such as those of Mn, Fe, Co, Ni, Cu, Zn and so forth, and a metallic catalyst, such as zinc octanoate, cobalt octanoate and so forth. Preferably, the curing accelerator is a peroxide curing accelerator capable of producing free radicals, which comprises but not limited to: dicumyl peroxide, t-butyl peroxybenzoate and di-t-butylperoxydiisopropylbenzene.

For instance, the inorganic filler may comprise at least one of silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and kaolinite. Preferably, the inorganic filler is spherical, fibrous, plate-shaped, particulate, sheet-like or whisker-like in shape, and it can be optionally pre-treated by a silane coupling agent (silane or siloxane compound).

The main purpose of incorporating a surfactant is to uniformly disperse the inorganic filler in the resin composition. The surfactant may comprise a silane and a siloxane compound.

The main purpose of incorporating a toughening agent is to improve the toughness of the resin composition. The toughening agent may comprise additives such as a rubber resin, a carboxyl-terminated butadiene acrylonitrile rubber (CTBN), a core-shell rubber and so forth.

The main purpose of incorporating a solvent is to change the solid content of the resin composition and adjust the viscosity of the resin composition. The solvent may comprise, for example, methanol, ethanol, ethylene glycol monomethyl ether, acetone, butanone (also known as methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, propylene glycol methyl ether or a mixed solvent thereof.

In one embodiment, the resin composition of the present disclosure further comprises another polyphenylene ether (referred to as a second polyphenylene ether) in addition to the phosphorus-containing vinyl polyphenylene ether.

Unless otherwise specified, the amounts of the phosphorus-containing vinyl polyphenylene ether and the second polyphenylene ether as well as the ratio between each component can be adjusted according to the needs. For instance, in one embodiment, the present disclosure discloses a resin composition comprising 50 to 100 parts by weight of the phosphorus-containing vinyl polyphenylene ether and 0 to 50 parts by weight of the second polyphenylene ether; for instance, in one embodiment, the present disclosure discloses a resin composition comprising 60 parts by weight of the phosphorus-containing vinyl polyphenylene ether and 40 parts by weight of the second polyphenylene ether; in another embodiment, the present disclosure discloses a resin composition comprising 70 parts by weight of the phosphorus-containing vinyl polyphenylene ether and 30 parts by weight of the second polyphenylene ether.

The type of the aforementioned second polyphenylene ether is not particularly limited; for example, it may comprise any of the following or a combination thereof: dihydroxyl polyphenylene ether (e.g. SA-90, which is available from Sabic), divinylbenzyl polyphenylene ether resin (e.g. OPE-2st, which is available from Mitsubishi Gas Chemical Company), vinyl-benzylated modified bisphenol A polyphenylene ether, methacrylate polyphenylene ether resin (e.g. SA-9000, which is available from Sabic), and chain-extended polyphenylene ether.

Product of Resin Composition

The aforementioned resin composition can be utilized to form various products by a variety of processing methods, for example, components applicable to all types of electronic products, which comprise but not limited to a resin film, a resin-coated copper, a prepreg, a laminate and a printed circuit board.

For instance, the resin composition of each embodiment in the present disclosure can be coated on a PET film (polyester film) or a PI film (polyimide film), followed by baking and heating to a semi-cured stage (B-staged) to obtain a resin film.

For instance, the resin composition of each embodiment in the present disclosure can be coated on a copper foil, followed by baking and heating to a semi-cured stage to obtain a resin-coated copper (RCC).

For instance, the resin composition of each embodiment in the present disclosure can be utilized to form prepregs, which have a reinforcement material and a layer (insulating layer) disposed on the reinforcement material. The layer is formed by curing the aforementioned resin composition by heating at high temperature to the semi-cured stage, and the baking temperature for forming the prepregs is, for example, between 120° C. and 190° C. The reinforcement material may be a fibrous material, woven fabric and non-woven fabric, such as glass fiber fabric and so forth, so as to improve the mechanical strength of the prepregs. Preferably, the reinforcement material is optionally pre-treated by a silane coupling agent.

For instance, the resin composition of each embodiment in the present disclosure can be utilized to form various laminates, such as copper-clad laminates and so forth, which comprise two copper foils and one insulating layer (such as the aforementioned layer); the insulating layer is disposed between the copper foils, and the insulating layer is formed by curing the aforementioned resin composition at high temperature and high pressure. The applicable curing temperature is, for example, between 150° C. and 230° C. The insulating layer may be the aforementioned prepreg or resin film.

The laminate can be further processed to form a printed circuit board by trace processing.

Characteristic Description

The resin composition and products made therefrom, such as resin films, prepregs, resin-coated coppers, laminates or printed circuit boards, can achieve one, multiple or all of the following desirable properties: better resin flow property, better laminate appearance, ideal glass transition temperature, coefficient of thermal expansion, thermal expansion, thermal resistance, dielectric properties and flame retardancy of the laminate thus made.

Compared with conventional resin compositions having different components and ratios, the present disclosure pertains to the resin composition and product thereof which can achieve any one or the combination of any two or multiple or all of the aforementioned properties, such that it can better meet the requirements of the industry.

Embodiments

Various raw materials from the following sources are used, and the resin compositions of the examples and comparative examples of the present disclosure are respectively prepared according to the use amounts of Table 1 to Table 4 and are further processed to form the tested specimen or products.

Methacrylate polyphenylene ether: SA-9000, available from Sabic.

Vinylbenzyl polyphenylene ether: OPE-2st, available from Mitsubishi Gas Chemical Company.

Chain-extended vinylbenzyl polyphenylene ether: PPO-1, synthesized according to the method disclosed in US Patent Application Publication 2016/0185904 A1.

Diethyl allyl phosphonate flame retardant: DEAP, available from Tai Ti Co., Ltd.

Allyl phosphazene flame retardant: SPV-100, available from Otsuka Chemical Co., Ltd.

Acrylate DOPO flame retardant: MF784, available from UFC Corporation.
Dicumyl peroxide (DCP): available from Sigma Aldrich.
Spherical silica: SC-2050, available from Admatechs.
DOPO derivative: MF 535, available from UFC Corporation.
Phosphazene flame retardant (without reactive functional groups): SPB-100, available from Otsuka Chemical Co., Ltd.
2-propenoic acid 1,1'-[(octahydro-4,7-methano-1H-indene-5,6-diyl)bis(methylene)] ester: SR833s, available from Cray Valley.
Polybutadiene: Ricon142, available from Cray Valley.
1,2,4-trivinylcyclohexane resin (TVCH): available from Evonik.
Styrene-butadiene copolymer: G1657, available from Kraton.
2,5-dimethyl-2,5-di(t-butylperoxy) hexyne-3 (25B) peroxide: available from NOF Corporation.
Benzoyl peroxide (BPO): available from Sigma Aldrich.

Preparation of Prepolymer

The polyphenylene ether prepolymer used in the resin compositions in the examples and comparative examples of the present disclosure is prepared according to the following description.

Component A-1: 70 g of OPE-2st, 30 g of SPV-100, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component A-1.

Component A-1 is analyzed by Fourier transform infrared spectroscopy (FTIR), and the results indicate that FTIR absorption peaks appear at 1266.53 cm$^{-1}$ (representing the presence of P=O) and 908.39 cm$^{-1}$ (representing the presence of vinyl group). Thus, it can be confirmed that the obtained product is a prepolymer of OPE-2st and SPV-100.

Component A-2: 85 g of OPE-2st, 15 g of SPV-100, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component A-2, which is also a prepolymer of OPE-2st and SPV-100.

Component B: 70 g of OPE-2st, 30 g of DEAP, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component B, which is a prepolymer of OPE-2st and DEAP.

Component C: 70 g of OPE-2st, 30 g of SPB-100, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component C.

Component D: 70 g of SA-9000, 30 g of SPV-100, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component D, which is a prepolymer of SA-9000 and SPV-100.

Component E: 70 g of PPO-1, 30 g of SPV-100, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component E, which is a prepolymer of PPO-1 and SPV-100.

Component F: 70 g of OPE-2st, 30 g of MF784, 0.05 g of BPO and 150 g of toluene are added into a stirred tank, mixed well and heated to 95° C., and stirred for 4 hours. Water is added while stirring and waste liquid is removed. Reduced pressure distillation is performed to remove solvent, obtaining a product named as Component F, which is a prepolymer of OPE-2st and MF784.

Preparation of Varnish

As shown in the following Tables 1 to 4, for each of the examples (designated as E, such as E1, E2 and so forth) and comparative examples (designated as C, such as C1, C2 and so forth), according to the amounts in the tables, each component is added into a stirred tank for stirring. After being well-mixed, the resin compositions are formed, referred herein as a varnish.

TABLE 1

Constitution of the resin compositions of Examples and Comparative Examples
(unit: parts by weight)

| Resin composition | Components | Name | E1 | E2 | E3 | E4 | E5 | E6 | C1 | C2 | C3 |
|---|---|---|---|---|---|---|---|---|---|---|---|
| Polyphenylene ether | Product of allyl phosphazene and vinylbenzyl polyphenylene ether | Component A-1 | 100 | | | | | | | | |
| | Product of allyl phosphazene and vinylbenzyl polyphenylene ether | Component A-2 | | 100 | | | | | | | |
| | Product of diethyl allyl phosphonate and vinylbenzyl polyphenylene ether | Component B | | | | | | | 100 | | |

TABLE 1-continued

Constitution of the resin compositions of Examples and Comparative Examples
(unit: parts by weight)

| Resin composition | Components | Name | E1 | E2 | E3 | E4 | E5 | E6 | C1 | C2 | C3 |
|---|---|---|---|---|---|---|---|---|---|---|---|
| | Product of phosphazene and vinylbenzyl polyphenylene ether | Component C | | | | | | | 100 | | |
| | Product of allyl phosphazene and methacrylate polyphenylene ether | Component D | | 100 | | | | | | | |
| | Product of allyl phosphazene and chain-extended polyphenylene ether (PPO-1) | Component E | | | 100 | | | | | | |
| | Product of acrylate DOPO flame retardant and vinylbenzyl polyphenylene ether | Component F | | | | 100 | | | | | |
| | Methacrylate polyphenylene ether | SA-9000 | | | | | | | | | |
| | Vinylbenzyl polyphenylene ether | OPE-2st | | | | | | | | 85 | 70 |
| | Chain-extended polyphenylene ether | PPO-1 | | | | | | | | | |
| Flame retardant | Diethyl allyl phosphonate flame retardant | DEAP | | | | | | | | | |
| | Allyl phosphazene flame retardant | SPV-100 | | | | | | | | 15 | 30 |
| | Acrylate DOPO flame retardant | MF784 | | | | | | | | | |
| Peroxide | Dicumyl peroxide | DCP | 1 | 1 | 1 | 1 | 1 | 1 | 1 | 1 | 1 |
| Inorganic filler | Spherical silica | SC-2050 | 70 | 70 | 70 | 70 | 70 | 70 | 70 | 70 | 70 |
| Solvent | Toluene | | 100 | 100 | 100 | 100 | 100 | 100 | 100 | 100 | 100 |

TABLE 2

Constitution of the resin compositions of Examples and Comparative Examples
(unit: parts by weight)

| Resin composition | Components | Name | C4 | C5 | C6 | C7 | C8 | E7 | C9 | C10 | C11 |
|---|---|---|---|---|---|---|---|---|---|---|---|
| Polyphenylene ether | Product of allyl phosphazene and vinylbenzyl polyphenylene ether | Component A-1 | | | | | | 50 | | | |
| | Product of allyl phosphazene and vinylbenzyl polyphenylene ether | Component A-2 | | | | | | | | | |
| | Product of diethyl allyl phosphonate and vinylbenzyl polyphenylene ether | Component B | | | | | | 50 | | | |

TABLE 2-continued

Constitution of the resin compositions of Examples and Comparative Examples
(unit: parts by weight)

| Resin composition | Components | Name | C4 | C5 | C6 | C7 | C8 | E7 | C9 | C10 | C11 |
|---|---|---|---|---|---|---|---|---|---|---|---|
| | Product of phosphazene and vinylbenzyl polyphenylene ether | Component C | | | | | | | | | |
| | Product of allyl phosphazene and methacrylate polyphenylene ether | Component D | | | | | | | | | |
| | Product of allyl phosphazene and chain-extended polyphenylene ether (PPO-1) | Component E | | | | | | | | | |
| | Product of acrylate DOPO flame retardant and vinylbenzyl polyphenylene ether | Component F | | | | | | | | | |
| | Methacrylate polyphenylene ether | SA-9000 | | | | 70 | | | 100 | | |
| | Vinylbenzyl polyphenylene ether | OPE-2st | 70 | 70 | | | 55 | | | 100 | |
| | Chain-extended polyphenylene ether | PPO-1 | | | | | | 70 | | | 100 |
| Flame retardant | Diethyl allyl phosphonate flame retardant | DEAP | 30 | | | | | | | | |
| | Allyl phosphazene flame retardant | SPV-100 | | | 30 | 30 | 45 | | | | |
| | Acrylate DOPO flame retardant | MF784 | | 30 | | | | | | | |
| Peroxide | Dicumyl peroxide | DCP | 1 | 1 | 1 | 1 | 1 | 1 | 1 | 1 | 1 |
| Inorganic filler | Spherical silica | SC-2050 | 70 | 70 | 70 | 70 | 70 | 70 | 70 | 70 | 70 |
| Solvent | Toluene | | 100 | 100 | 100 | 100 | 100 | 100 | 100 | 100 | 100 |

TABLE 3

Constitution of the resin compositions of Examples and Comparative Examples
(unit: parts by weight)

| Resin composition | Components | Name | E11 | E12 | E13 | E14 | E15 | E16 | E19 |
|---|---|---|---|---|---|---|---|---|---|
| Polyphenylene ether | Product of allyl phosphazene and vinylbenzyl polyphenylene ether | Component A-1 | 70 | 60 | 100 | 100 | 100 | 100 | 100 |
| | Vinylbenzyl polyphenylene ether | OPE-2st | 30 | 40 | | | | | |
| Flame retardant | DOPO derivative | MF 535 | | | 25 | 75 | 30 | 30 | 30 |
| | Diethyl allyl phosphonate flame retardant | DEAP | | | | | | | |
| | Allyl phosphazene flame retardant | SPV-100 | | | | | | | |
| | Acrylate DOPO flame retardant | MF784 | | | | | | | |
| | Phosphazene flame retardant | SPB-100 | | | | | | | |

TABLE 3-continued

Constitution of the resin compositions of Examples and Comparative Examples
(unit: parts by weight)

| Resin composition | Components | Name | E11 | E12 | E13 | E14 | E15 | E16 | E19 |
|---|---|---|---|---|---|---|---|---|---|
| Vinyl compound (crosslinking agent) | 2-Propenoic acid,1,1'-[(octahydro-4,7-methano-1H-indene-5,6-diyl)bis(methylene)] ester | SR833s | | | | | | 5 | 10 |
| | Polybutadiene | Ricon142 | | | | | | | |
| | Trivinylcyclohexane | TVCH | | | | | | | 10 |
| | Styrene-butadiene copolymer | G1657 | | | | | | | |
| Peroxide | 2,5-dimethyl-2,5-di(t-butylperoxy)hexyne-3 | 25B | 1 | 1 | 1 | 1 | 1 | 1 | 1 |
| Inorganic filler | Spherical silica | SC-2050 | 70 | 70 | 70 | 70 | 70 | 70 | 70 |
| Solvent | Toluene | | 100 | 100 | 100 | 100 | 100 | 100 | 100 |
| | MEK | | 30 | 30 | 30 | 30 | 30 | 30 | 30 |

TABLE 4

Constitution of the resin compositions of Examples and Comparative Examples
(unit: parts by weight)

| Resin composition | Components | Name | E20 | E21 | E22 | E23 | E24 | C14 | C16 | C17 |
|---|---|---|---|---|---|---|---|---|---|---|
| Polyphenylene ether | Product of allyl phosphazene and vinylbenzyl polyphenylene ether | Component A-1 | 100 | 100 | 100 | 100 | 100 | | | |
| | Vinylbenzyl polyphenylene ether | OPE-2st | | | | | | 70 | 70 | 70 |
| Flame retardant | DOPO derivative | MF 535 | 30 | 30 | 65 | 75 | 30 | 65 | | |
| | Diethyl allyl phosphonate flame retardant | DEAP | | | | | | | | 30 |
| | Allyl phosphazene flame retardant | SPV-100 | | | | | | 30 | | |
| | Acrylate DOPO flame retardant | MF784 | | | | | | | 30 | |
| | Phosphazene flame retardant | SPB-100 | | | | | | | 65 | 65 |
| Vinyl compound (crosslinking agent) | 2-Propenoic acid,1,1'-[(octahydro-4,7-methano-1H-indene-5,6-diyl)bis(methylene)] ester | SR833s | | | 10 | 8 | 20 | 10 | 10 | 10 |
| | Polybutadiene | Ricon142 | | | 10 | 5 | | 10 | 10 | 10 |
| | Trivinylcyclohexane | TVCH | 3 | 6 | 10 | 5 | | 10 | 10 | 10 |
| | Styrene-butadiene copolymer | G1657 | | | 5 | 8 | | 5 | | |
| Peroxide | 2,5-dimethyl-2,5-di(t-butylperoxy)hexyne-3 | 25B | 1 | 1 | 2 | 2 | 1 | 2 | 1 | 1 |
| Inorganic filler | Spherical silica | SC-2050 | 70 | 70 | 70 | 70 | 70 | 70 | 70 | 70 |
| Solvent | Toluene | | 100 | 100 | 100 | 100 | 100 | 100 | 100 | 100 |
| | MEK | | 30 | 30 | 30 | 30 | 30 | 30 | 30 | 30 |

The following examples describe the products or specimens prepared from the resin composition of the present disclosure and the preparation methods thereof.

Prepreg: Resin compositions of the Examples and Comparative Examples were respectively placed in an impregnation tank, and glass fiber fabrics (2116 E-glass fiber fabrics) available from Nan Ya Plastics Corporation were impregnated in the impregnation tank, such that the resin compositions were attached on the glass fiber fabrics. After heating and baking at 130° C., semi-cured prepreg were obtained.

Copper-clad laminate (6-ply): Two sheets of copper foils with a 18 μm thickness and six sheets of the prepregs (each having a resin content of about 56%) formed by each of the specimens were prepared. A copper foil, six prepregs and a copper foil were laminated in order, and each copper-clad laminate was formed by lamination under vacuum at 200° C.

for two hours, wherein the six prepregs were cured to form the insulating layers between the two copper foils, and the resin content of the insulating layers is about 56%.

Copper-free laminate (6-ply): Each copper-clad laminate (6-ply) obtained above was etched for removing two copper foils so as to obtain the copper-free laminate (6-ply), wherein the copper-free laminate (6-ply) was formed by laminating 6 sheets of prepregs, and the resin content of the copper-free laminate (6-ply) is about 56%.

Copper-free laminate (2-ply): Two sheets of copper foils with a 18 µm thickness and two sheets of the prepregs (each having a resin content of about 56%) formed by each of the specimens were prepared. A copper foil, two prepregs and a copper foil were laminated in order, and a copper-clad laminate (2-ply) was formed by lamination under vacuum at 200° C. for two hours. Then the copper-clad laminate obtained above was etched for removing the two copper foils so as to obtain the copper-free laminate (2-ply), wherein the insulating layer was formed by laminating two sheets of prepregs, and the resin content of the copper-free laminate (2-ply) is about 56%.

The test method of each property is described below.

Coefficient of thermal expansion (CTE alpha 1, z-axis): temperature interval of the coefficient of thermal expansion is between 50° C. and 110° C., and it is measured by a TMA instrument by reference to IPC-TM-650 2.4.24.5 (unit: ppm/° C.). In general, lower coefficient of thermal expansion is more preferred, and a difference in coefficient of thermal expansions of greater than 5 ppm/° C. represents a significant difference.

Laminate appearance: determine whether the surface of the copper-free laminate (6-ply) is a flat and smooth surface or has weave exposure by visual inspection. If the surface of the laminate is flat and smooth, the laminate is not designated as a dry laminate. If merely a small portion around the laminate has weave exposure, it is designated as slightly dry laminate. If the whole laminate (including the periphery and the middle portion) contains a large area of irregular weave exposure, then it is designated as seriously dry laminate.

Glass transition temperature (Tg): the aforementioned copper-free laminate (6-ply) is used as a specimen. The glass transition temperature is measured at a temperature interval between 50° C. and 260° C. by a thermal mechanical analyzer (TMA) by reference to IPC-TM-650 2.4.24.5.

Thermal expansion (dimensional change, z-axis): in the measurement of thermal expansion, the copper-free laminate (6-ply) is used as a specimen. The dimensional change ratio (%) of each specimen is measured at a temperature interval between 50° C. and 260° C. by a thermal mechanical analyzer (TMA) by reference to IPC-TM-650 2.4.24.5. In general, lower thermal expansion is more preferred, and a difference in thermal expansion of greater than 0.1% represents a significant difference.

Thermal resistance (T288): in the thermal resistance test, the copper-clad laminate (6-ply) 6.5 mm×6.5 mm in size is used as a specimen. It is measured under a constant temperature of 288° C. by a thermal mechanical analyzer by reference to IPC-TM-650 2.4.24.1, and the time-to-delamination after heating is measured. In general, longer time indicates better thermal resistance of the copper-clad laminate made from the resin composition.

Solder dipping test (S/D): in the solder dipping test, the aforementioned copper-clad laminate (6-ply) is tested by reference to IPC-TM-650 2.4.23. Each specimen is dipped in a solder bath set at a constant temperature of 288° C. for 10 seconds as one cycle and then removed therefrom and placed at room temperature for 10 seconds. The specimen is then re-immersed in the solder bath for 10 seconds and removed therefrom and placed at room temperature for 10 seconds. The processes are repeated, and the number of cycles to delamination of each specimen is recorded. Generally, greater number of cycles to delamination of each specimen represents higher thermal resistance of the product, such as copper clad laminate, made from the resin composition.

Dielectric constant (Dk): in dielectric constant measurement, the aforesaid copper-free laminate (2-ply) is used as the specimen. A microwave dielectrometer commercially available from AET Inc. is used by reference to the procedure described in JIS C2565 (Measuring methods for ferrite cores for microwave device) to make the measurement under room temperature at 10 GHz frequency. Generally, lower dielectric constant represents a better dielectric property of the specimen. A difference greater than 0.05 in Dk indicates significant difference in dielectric constant of different laminates.

Dielectric loss (DO: in dielectric loss measurement, the aforesaid copper-free laminate (2-ply) is used as the specimen. A microwave dielectrometer commercially available from AET Inc. is used by reference to the procedure described in JIS C2565 (Measuring methods for ferrite cores for microwave device) to make the measurement under room temperature at 10 GHz frequency. Generally, lower dielectric loss represents a better dielectric property of the specimen. A difference less than 0.0005 in Df indicates no significant difference in dielectric loss of laminates, and a difference greater than 0.0005 in Df indicates significant difference in dielectric loss of different laminates.

Flame retardancy: in the flame retardancy test, the copper-free laminate (6-ply) 125 mm×13 mm in size is used as the specimen. It is measured according to UL94, and the results of flame retardancy are designated as V-0, V-1 and V-2, wherein the flame retardancy of V-0 is superior to that of V-1, the flame retardancy of V-1 is superior to that of V-2, and burn-out represents the worst flame retardancy.

Resin flow: by reference to IPC-TM-650 2.3.17, 4 sheets (4.0±0.010 in)×(4.0±0.010 in) of prepregs impregnated with 2116 glass fiber fabric are weighed as $W_0$. The 4 prepregs are laminated in the order of steel plate/release film/4 prepregs/release film/steel plate. After being stacked, they are placed in a laminator for hot pressing at a temperature of 171±3° C. and a pressure of 200±10 psi for 5 minutes. The samples are removed after hot pressing and cooled to room temperature, and then they are punched to form circular samples with a diameter of 3.192 in (81.1 mm) by a circular punch. The circular samples are weighed as $W_d$, and the resin flow (%) is calculated by the following formula:

$$\text{Resin flow \%} = ((W_0 - 2W_d)/W_0) \times 100\%$$

The test results are listed in Tables 5 to 8.

TABLE 5

Test results of the Examples and Comparative Examples

| Property | Test item (method) | Unit | E1 | E2 | E3 | E4 | E5 | E6 | C1 | C2 | C3 |
|---|---|---|---|---|---|---|---|---|---|---|---|
| Coefficient of thermal expansion | CTE (alpha 1, 50-110° C.) | ppm/° C. | 47 | 45 | 43 | 48 | 50 | 48 | 65 | 52 | 58 |
| Laminate appearance | Visual inspection of dry laminate | N.A. | No | No | No | No | No | No | No | No | No |
| Glass transition temperature | Tg (TMA) | ° C. | 165 | 168 | 172 | 162 | 152 | 160 | 150 | 162 | 157 |
| Thermal expansion | Dimensional change (TMA) | % | 2.71 | 2.51 | 2.65 | 2.71 | 2.84 | 2.96 | 3.98 | 2.91 | 2.95 |
| 288° C. thermal resistance | T288 (TMA) | min | >70 | >70 | >70 | >70 | >70 | >70 | 30 | 67 | 64 |
| Solder dipping test | S/D | cycle | >20 | >20 | >20 | >20 | >20 | >20 | >20 | >20 | >20 |
| Dielectric constant | Dk@10 GHz | N.A. | 3.73 | 3.73 | 3.73 | 3.74 | 3.94 | 3.77 | 3.87 | 3.79 | 3.79 |
| Dielectric loss | Dk@10 GHz | N.A. | 0.0058 | 0.0057 | 0.0058 | 0.0058 | 0.0062 | 0.0059 | 0.0065 | 0.0059 | 0.0061 |
| Flame retardancy | UL94 | N.A. | V-1 | V-1 | V-1 | V-1 | V-1 | V-2 | V-2 | V-2 | V-1 |
| Resin flow | resin flow | % | 25 | 29 | 27 | 24 | 25 | 30 | 35 | 18 | 19 |

TABLE 6

Test results of the Examples and Comparative Examples

| Property | Test item (method) | Unit | C4 | C5 | C6 | C7 | C8 | E7 | C9 | C10 | C11 |
|---|---|---|---|---|---|---|---|---|---|---|---|
| Coefficient of thermal expansion | CTE (alpha 1, 50-110° C.) | ppm/° C. | 55 | 62 | 52 | 61 | — | — | 60 | 59 | 63 |
| Laminate appearance | Visual inspection of dry laminate | N.A. | No | No | No | No | No | No | Serious dry laminate | | |
| Glass transition temperature | Tg (TMA) | ° C. | 162 | 152 | 158 | 145 | 145 | 160 | 175 | 174 | 151 |
| Thermal expansion | Dimensional change (TMA) | % | 3.05 | 3.14 | 3.35 | 3.55 | 3.25 | 2.91 | 2.69 | 2.66 | 2.87 |
| 288° C. thermal resistance | T288 (TMA) | min | 68 | 50 | 66 | 64 | 60 | >70 | >70 | >70 | >70 |
| Solder dipping test | S/D | cycle | >20 | 15 | >20 | >20 | >20 | >20 | >20 | >20 | >20 |
| Dielectric constant | Dk@10 GHz | N.A. | 3.73 | 3.94 | 3.89 | 3.85 | 3.89 | 3.71 | 3.77 | 3.71 | 3.83 |
| Dielectric loss | Dk@10 GHz | N.A. | 0.0059 | 0.0065 | 0.0071 | 0.0068 | 0.0068 | 0.0058 | 0.0061 | 0.0058 | 0.0059 |
| Flame retardancy | UL94 | N.A. | V-2 | V-1 | V-1 | V-1 | V-1 | V-1 | | Burn-out | |
| Resin flow | resin flow | % | 26 | 20 | 15 | 20 | 18 | 27 | 5 | 7 | 8 |

TABLE 7

Test results of the Examples and Comparative Examples

| Property | Test item (method) | Unit | E11 | E12 | E13 | E14 | E15 | E16 | E19 |
|---|---|---|---|---|---|---|---|---|---|
| Glass transition temperature | Tg (TMA) | ° C. | 170 | 167 | 167 | 164 | 169 | 175 | 164 |
| Thermal expansion | Dimensional change (TMA) | % | 2.78 | 2.71 | 2.63 | 2.55 | 2.61 | 2.51 | 2.51 |
| 288° C. thermal resistance | T288 (TMA) | min | >70 | >70 | >70 | >70 | >70 | >70 | >70 |
| Solder dipping test | S/D | cycle | >20 | >20 | >20 | >20 | >20 | >20 | >20 |
| Dielectric constant | Dk@10 GHz | N.A. | 3.79 | 3.74 | 3.72 | 3.89 | 3.73 | 3.81 | 3.69 |

TABLE 7-continued

Test results of the Examples and Comparative Examples

| Property | Test item (method) | Unit | E11 | E12 | E13 | E14 | E15 | E16 | E19 |
|---|---|---|---|---|---|---|---|---|---|
| Dielectric loss | Dk@10 GHz | N.A. | 0.0059 | 0.0058 | 0.0056 | 0.0055 | 0.0055 | 0.0057 | 0.0055 |
| Flame retardancy | UL94 | N.A. | V-1 | V-1 | V-0 | V-0 | V-0 | V-0 | V-0 |
| Resin flow | resin flow | % | 23 | 21 | 22 | 14 | 20 | 22 | 26 |

TABLE 8

Test results of the Examples and Comparative Examples

| Property | Test item (method) | Unit | E20 | E21 | E22 | E23 | E24 | C14 | C16 | C17 |
|---|---|---|---|---|---|---|---|---|---|---|
| Glass transition temperature | Tg (TMA) | °C. | 164 | 164 | 162 | 165 | 178 | 145 | 152 | 152 |
| Thermal expansion | Dimensional change (TMA) | % | 2.81 | 2.79 | 2.61 | 2.92 | 2.48 | 2.92 | 3.21 | 3.21 |
| 288° C. thermal resistance | T288 (TMA) | min | >70 | >70 | >70 | >70 | >70 | 30 | 30 | 30 |
| Solder dipping test | S/D | cycle | >20 | >20 | >20 | >20 | >20 | 15 | 15 | 15 |
| Dielectric constant | Dk@10 GHz | N.A. | 3.71 | 3.71 | 3.65 | 3.68 | 3.88 | 3.86 | 3.88 | 3.84 |
| Dielectric loss | Dk@10 GHz | N.A. | 0.0055 | 0.0055 | 0.0058 | 0.0058 | 0.0061 | 0.0058 | 0.0066 | 0.0065 |
| Flame retardancy | UL94 | N.A. | V-0 | V-0 | V-0 | V-0 | V-0 | V-0 | V-0 | V-0 |
| Resin flow | resin flow | % | 23 | 25 | 15 | 13 | 24 | 13 | 19 | 19 |

The following observations can be made from the comparison of Tables 1 to 8.

From E1 and C1, it is observed that as compared with other phosphorus-containing compounds, the pre-polymerization of a phosphorus-containing vinyl compound with a vinyl polyphenylene ether can achieve a higher Tg, a lower coefficient of thermal expansion, a lower thermal expansion, a better T288 thermal resistance, lower dielectric properties and a better flame retardancy.

From E1 to E6 and C2 to C7, it is observed that as compared with the addition of a phosphorus-containing vinyl compound, the prepolymer formed by the pre-polymerization of a phosphorus-containing vinyl compound with a vinyl polyphenylene ether has a higher Tg, a lower coefficient of thermal expansion, a lower thermal expansion and a better T288 thermal resistance.

From E1 to E4 and C9 to C11, it is observed that as compared with the polyphenylene ether without pre-polymerization with a phosphorus-containing vinyl compound, the prepolymer formed by the pre-polymerization of a phosphorus-containing vinyl compound with a vinyl polyphenylene ether has a lower coefficient of thermal expansion, a better resin flow and a better laminate appearance.

From the above data, the present disclosure can achieve one, two, multiple or all of the following effects: the Z-axis coefficient of thermal expansion (α1) is lower than or equal to 50 ppm/° C.; the Z-axis thermal expansion is lower than or equal to 2.96%; the thermal resistance T288 is greater than 70 minutes; UL94 V0 or V1 is achieved; better resin flow, such as between 10% and 30%; the glass transition temperature (Tg) is higher than or equal to 150° C.; without delamination after 20 cycles of solder dipping tests; the dielectric constant is lower than or equal to 3.94; and the dissipation factor is lower than or equal to 0.0062.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A phosphorus-containing vinyl polyphenylene ether produced by a process comprising reacting a phosphorus-containing vinyl compound with a vinyl polyphenylene ether.

2. The phosphorus-containing vinyl polyphenylene ether according to claim 1, wherein the phosphorus-containing vinyl compound comprises an allyl phosphazene compound, a vinylbenzyl ether phosphazene compound, a vinyl phosphonate compound, an acrylate DOPO compound or a combination thereof.

3. The phosphorus-containing vinyl polyphenylene ether according to claim 2, wherein the phosphorus-containing vinyl compound comprises an allyl phosphazene compound having the following structural unit:

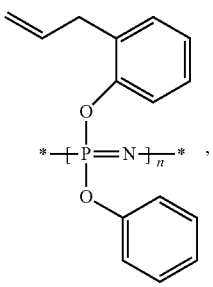

wherein n is an interger of 1 to 6.

4. The phosphorus-containing vinyl polyphenylene ether according to claim 2, wherein the phosphorus-containing vinyl compound comprises a vinylbenzyl ether phosphazene compound having the following structural unit:

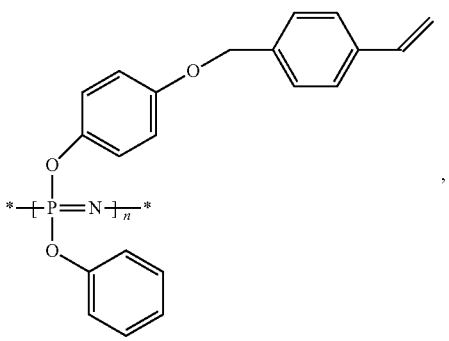

wherein n is an interger of 1 to 6.

5. The phosphorus-containing vinyl polyphenylene ether according to claim 1, wherein the vinyl polyphenylene ether comprises methacrylate polyphenylene ether, vinylbenzyl polyphenylene ether, chain-extended polyphenylene ether or a combination thereof.

6. A resin composition, comprising the phosphorus-containing vinyl polyphenylene ether according to claim 1 and at least one crosslinking agent.

7. The resin composition according to claim 6, wherein the crosslinking agent comprises divinylbenzene, bis(vinylphenyl) ether, isocyanate, polyphenylene ether resin, maleimide, polyamide, polyimide, styrene maleic anhydride copolymer, polyester, polyolefin, anhydride curing agent or a combination thereof.

8. The resin composition according to claim 6, further comprising any one of a phosphorus-containing flame retardant, a curing accelerator, an inorganic filler, a surfactant, a toughening agent, a solvent and a combination thereof.

9. The resin composition according to claim 6, further comprising a second polyphenylene ether.

10. The resin composition according to claim 9, wherein based on 100 parts by weight of the total amount of the resin composition, the content of the phosphorus-containing vinyl polyphenylene ether ranges from 50 to 100 parts by weight.

11. The resin composition according to claim 9, wherein based on 100 parts by weight of the total amount of the resin composition, the content of the second polyphenylene ether ranges from 0 to 50 parts by weight.

12. A product made from the resin composition according to claim 6, comprising a resin film, a prepreg, a resin-coated copper, a laminate or a printed circuit board.

13. The product according to claim 12, having a Z-axis coefficient of thermal expansion α1 as measured by a TMA instrument by reference to IPC-TM-650 2.4.24.5 of lower than or equal to 50 ppm/° C.

14. The product according to claim 12, having a Z-axis thermal expansion as measured by a TMA instrument by reference to IPC-TM-650 2.4.24.5 of lower than or equal to 2.9%.

15. The product according to claim 12, having a thermal resistance T288 as measured by a TMA instrument by reference to IPC-TM-650 2.4.24.1 of greater than 70 minutes.

16. The product according to claim 12, having a flame retardancy of UL94 V0 or V1.

* * * * *